US012703200B2

(12) United States Patent
Wilford-Hunt et al.

(10) Patent No.: US 12,703,200 B2
(45) Date of Patent: Aug. 11, 2026

(54) MOVABLE WHEEL COVER APPARATUS AND RELATED ACTUATION SYSTEMS FOR AERODYNAMIC EFFICIENCIES

(71) Applicant: Rivian IP Holdings, LLC, Irvine, CA (US)

(72) Inventors: Troy Wilford-Hunt, Mount Bethel, PA (US); James John Alexander Dowle, Laguna Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 336 days.

(21) Appl. No.: 18/458,963

(22) Filed: Aug. 30, 2023

(65) Prior Publication Data

US 2025/0074108 A1 Mar. 6, 2025

(51) Int. Cl.
*B60B 7/20* (2006.01)
*B60B 7/04* (2006.01)

(52) U.S. Cl.
CPC .................. *B60B 7/20* (2013.01); *B60B 7/04* (2013.01); *B60B 2900/1216* (2013.01)

(58) Field of Classification Search
CPC .......... B60B 7/0086; B60B 7/20; B60B 19/10
See application file for complete search history.

(56) References Cited

U.S. PATENT DOCUMENTS

| | | | | |
|---|---|---|---|---|
| 4,593,953 | A * | 6/1986 | Baba | B60B 7/0086 301/6.3 |
| 8,801,107 | B2 * | 8/2014 | Schmid | B60B 7/04 301/6.3 |
| 8,857,921 | B2 * | 10/2014 | Schmid | B60B 7/00 301/6.3 |
| 10,071,595 | B2 * | 9/2018 | Hasegawa | B60T 5/00 |
| 10,189,302 | B2 * | 1/2019 | Mayer Pujadas | B60B 7/0086 |
| 11,077,707 | B2 * | 8/2021 | Wong | B60B 7/066 |
| 2009/0195053 | A1 * | 8/2009 | Kruse | B60B 7/0053 301/6.4 |
| 2015/0069822 | A1 * | 3/2015 | Haase | B60B 1/06 301/37.101 |
| 2024/0198724 | A1 * | 6/2024 | Jin | B60B 7/066 |
| 2025/0162547 | A1 * | 5/2025 | Favaretto | B60B 19/10 |
| 2025/0196531 | A1 * | 6/2025 | Kim | B60B 7/20 |
| 2025/0236134 | A1 * | 7/2025 | Kim | B60B 19/10 |

* cited by examiner

*Primary Examiner* — Jason R Bellinger
(74) *Attorney, Agent, or Firm* — Patterson + Sheridan, LLP

(57) ABSTRACT

The present disclosure relates to apparatus for covering wheel components, and related wheel modules and vehicles. In one or more embodiments, a wheel module includes a wheel component including a plurality of wheel openings, and a cover frame. The cover frame includes a plurality of openings, and a plurality of divider sections at least partially dividing the plurality of openings. The wheel module includes an actuation system configured to rotationally drive the cover frame relative to the wheel component in response to centrifugal force to at least partially cover the wheel opening. The wheel module includes a retraction spring configured to bias the cover frame to rotationally drive the cover frame relative to the wheel component to at least partially uncover the wheel openings.

20 Claims, 8 Drawing Sheets

600
240
245
246
215
214
620
234
232
233
612
248
A1
216
247
246
615
611
613
619
614
237
214
215
210
242
212

MOVABLE WHEEL COVER APPARATUS AND RELATED ACTUATION SYSTEMS FOR AERODYNAMIC EFFICIENCIES

INTRODUCTION

Aerodynamics are an important design consideration for all types of vehicles. For example, improving vehicle aerodynamics increases energy efficiency and reduces wind noise. However, efforts to enhance aerodynamics can increase component wear (e.g., by reduced airflow causing increased pressure over the component and/or reduced heat dissipation from the component). Efforts to enhance aerodynamics can also negatively impact the aesthetic appeal of vehicle designs.

SUMMARY

The present disclosure relates to apparatus for covering wheel components, and related wheel modules and vehicle components.

In one or more embodiments, a wheel module includes a wheel component including a plurality of wheel openings, and a cover frame. The cover frame includes a plurality of openings, and a plurality of divider sections at least partially dividing the plurality of openings. The wheel module includes an actuation system configured to rotationally drive the cover frame relative to the wheel component in response to centrifugal force to at least partially cover the wheel opening. The wheel module includes a retraction spring configured to bias the cover frame to rotationally drive the cover frame relative to the wheel component to at least partially uncover the wheel openings.

In one or more embodiments, an apparatus for covering a wheel component includes a cover frame. The cover frame includes a plurality of openings, and a plurality of divider sections at least partially dividing the plurality of openings. The apparatus includes an actuation system configured to rotationally drive the cover frame in a first rotational direction in response to centrifugal force generated by spinning of the actuation system. The apparatus includes a retraction spring configured to bias the cover frame in response to rotation of the cover frame in the first rotational direction to rotationally drive the cover frame in a second rotational direction that is opposite of the first rotational direction.

In one or more embodiments, a vehicle includes one or more wheel modules. The one or more wheel modules include a wheel component including a first wheel opening and a plurality of second wheel openings. The one or more wheel modules include a cover frame including a first opening. The cover frame includes a plurality of second openings, and a plurality of divider sections at least partially dividing the plurality of second outer openings. The one or more wheel modules include an actuation system configured to rotationally drive the cover frame relative to the wheel component in response to centrifugal force to at least partially cover the plurality of second wheel openings. The one or more wheel modules include a retraction spring configured to bias the cover frame to rotationally drive the cover frame relative to the wheel component to at least partially uncover the plurality of second wheel openings.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting in scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure relates to apparatus for covering wheel components, and related wheel modules and vehicle components. In one or more embodiments, a wheel module includes a wheel component and a cover frame. The cover frame includes a plurality of openings and a plurality of divider sections. The wheel module includes an actuation system configured to rotationally drive the cover frame relative to the wheel component and in a first rotational direction in response to centrifugal force generated by spinning of the wheel component and the actuation system. The wheel module includes a retraction spring configured to bias the cover frame in response to the rotation of the cover frame relative to the wheel component in the first rotational direction, where the bias rotationally drives the cover frame relative to the wheel component and in a second rotational direction that is opposite of the first rotational direction. Rotation of the cover frame in the first rotational direction at least partially covers wheel openings of the wheel component, and rotation of the cover frame in the second rotational direction at least partially uncovers the wheel openings of the wheel component.

The subject matter facilitates brake cooling and reduced wheel pressure at low speeds, and increased aerodynamic efficiencies at higher speeds. The subject matter facilitates such benefits while maintaining design modularity and aesthetic appeal.

The disclosure contemplates that terms used herein such as "couples," "coupling," "couple," and "coupled" may include but are not limited to welding, fusing, melting together, interference fitting, and/or fastening such as by using bolts, threaded connections, pins, and/or screws. The disclosure contemplates that terms such as "couples," "coupling," "couple," and "coupled" may include but are not limited to integrally forming. The disclosure contemplates that terms such as "couples," "coupling," "couple," and "coupled" may include but are not limited to direct coupling and/or indirect coupling, such as indirect coupling through components such as links, blocks, and/or frames.

Figure 1:
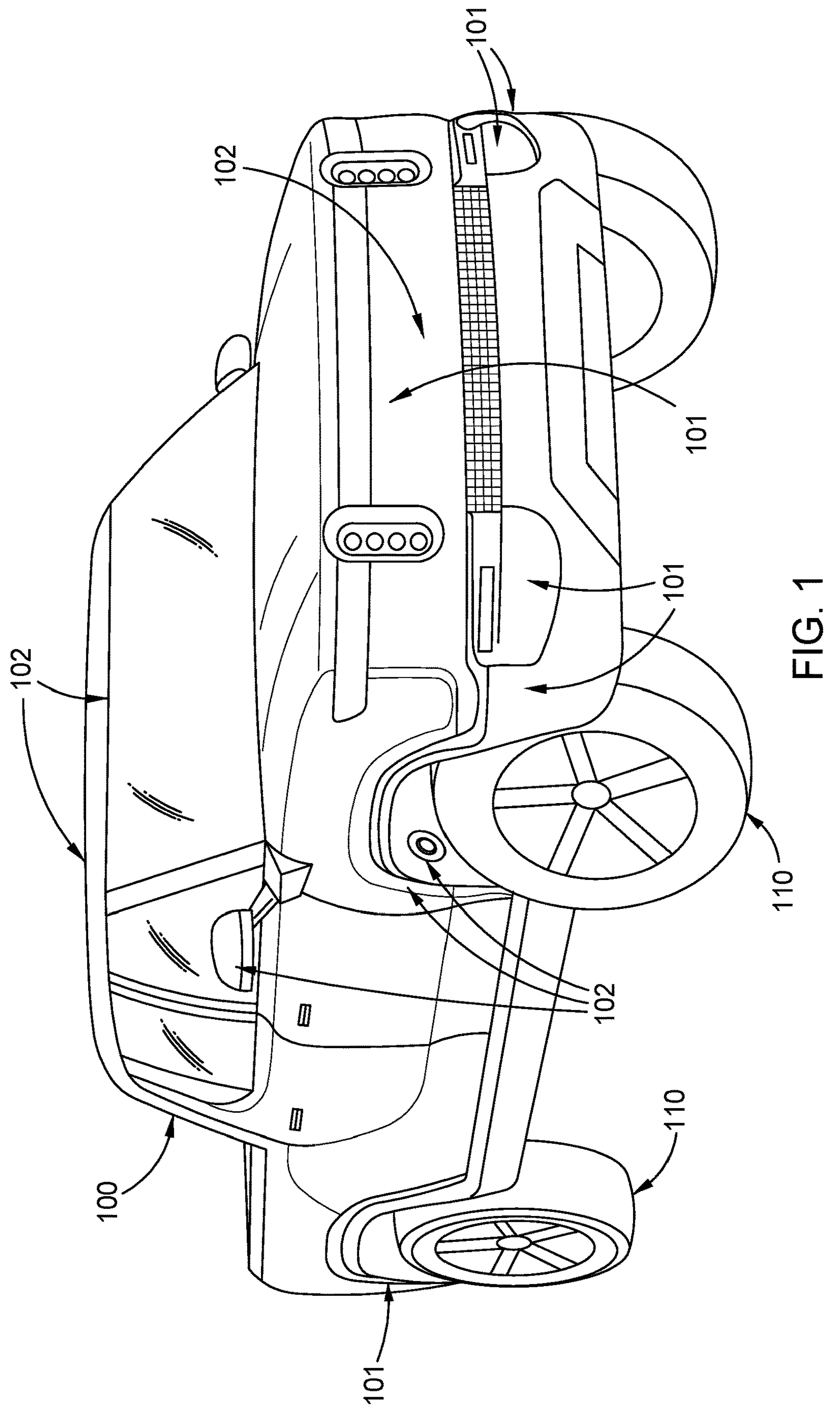
FIG. 1 is a schematic perspective view of a vehicle, according to one or more embodiments.

FIG. 1 is a schematic perspective view of a vehicle 100, according to one or more embodiments. The vehicle 100 may include multiple sensors 101 and/or multiple cameras 102. The vehicle 100 includes one or more wheel modules 110. In the implementation shown in FIG. 1, the vehicle 100 is a truck. The present disclosure contemplates that the subject matter described herein can be used in any other type of vehicle having any numbers of wheels, such as vans and/or sport-utility vehicles (SUVs).

Figures 2, 3:
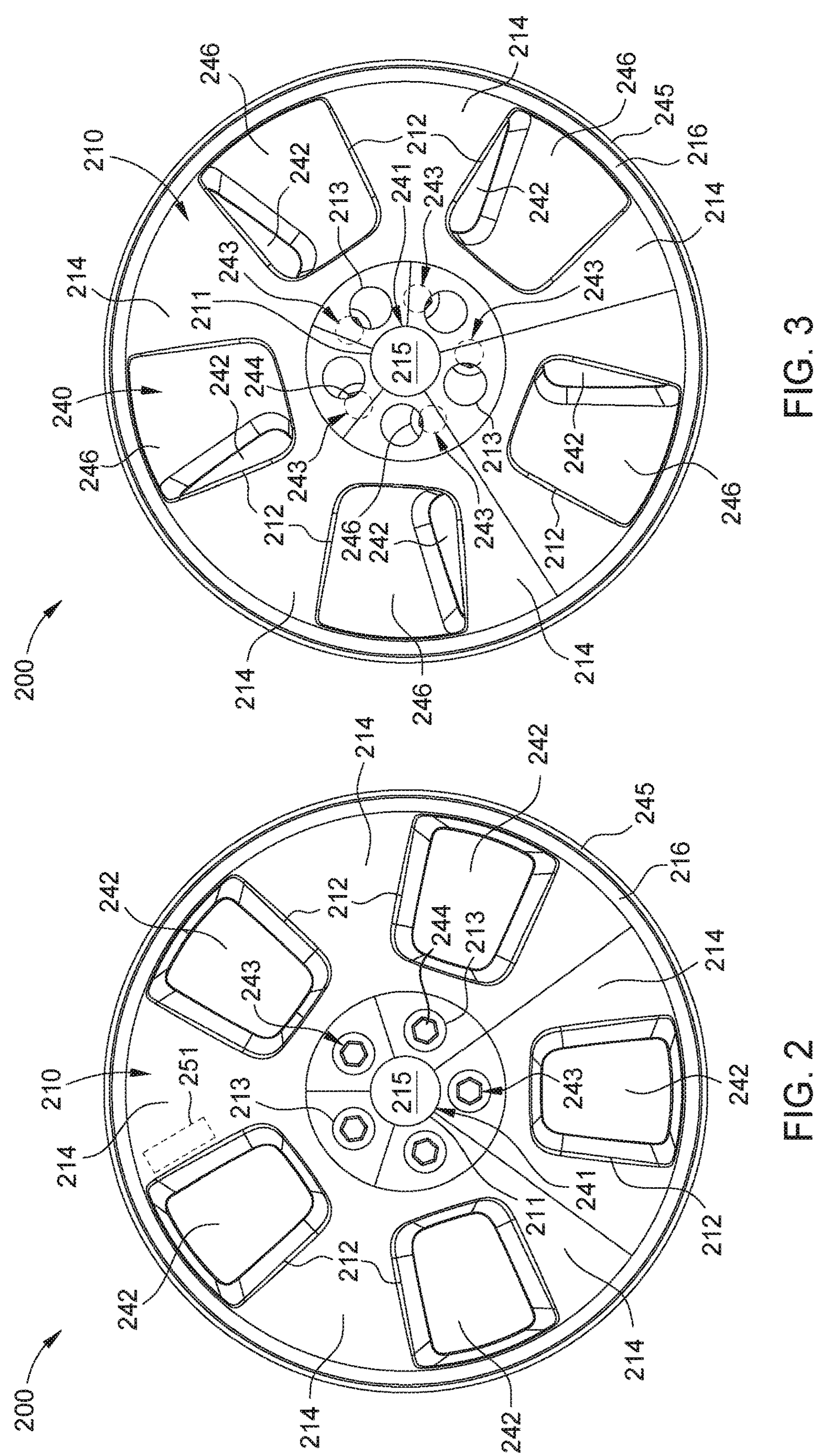
FIG. 2 is a schematic partial front view of a wheel module in a first position, according to one or more embodiments.
FIG. 3 is a schematic partial front view of the wheel module shown in FIG. 2 in a second position, according to one or more embodiments.

FIG. 2 is a schematic partial front view of a wheel module 200 in a first position, according to one or more embodiments. FIG. 3 is a schematic partial front view of the wheel module 200 shown in FIG. 2 in a second position, according to one or more embodiments. In one or more embodiments, each of the one or more wheel modules 110 of the vehicle 100 shown in FIG. 1 can include wheel module 200.

The wheel module 200 includes a cover frame 210. In one or more embodiments, the cover frame 210 is disc-shaped. The cover frame 210 includes a first opening 211 (e.g., a central opening), a plurality of second openings 212 (e.g., outer openings), and a plurality of divider sections 214 at least partially dividing the plurality of second openings 212. In one or more embodiments, the cover frame 210 includes a plurality of third openings 213. The cover frame 210 includes an outer section 216. In one or more embodiments, the outer section 216 is arcuate, such as in the shape of a ring. In one or more embodiments, the outer section 216 surrounds the second openings 212 and the divider sections 214, and the outer section 216 defines an outer perimeter of the cover frame 210. The plurality of second openings 212 are aligned radially between the first opening 211 and the outer section 216, and the divider sections 214 are aligned radially between the first opening 211 and the outer section 216.

The wheel module 200 includes a wheel component 240. The wheel component 240 can be, for example, a hub cap or a wheel. Other wheel components are contemplated. The wheel component 240 includes a first wheel opening 241 (e.g., a central wheel opening) and a plurality of second wheel openings 242 (e.g., outer wheel openings). In one or more embodiments, the wheel component 240 includes a plurality of third wheel openings 243. The wheel component 240 includes an outer wheel section 245, and a plurality of spokes 246 at least partially dividing the plurality of second wheel openings 242. The plurality of second wheel openings 242 are aligned radially between the first wheel opening 241 and the outer wheel section 245.

A center rod 215 is received in the first wheel opening 241, and the center rod 215 is received in the first opening 211. In the first position shown in FIG. 2, the second wheel openings 242 are completely uncovered by the cover frame 210. In the second position shown in FIG. 3, the divider sections 214 of the cover frame 210 at least partially cover the second wheel openings 242 (the second wheel openings 242 are shown as partially covered in FIG. 3). A plurality of fasteners 244 extend into the third wheel openings 243. The fasteners 244 can include, for example, lug nuts and/or wheel studs. Other fasteners are contemplated.

Figures 4, 5:
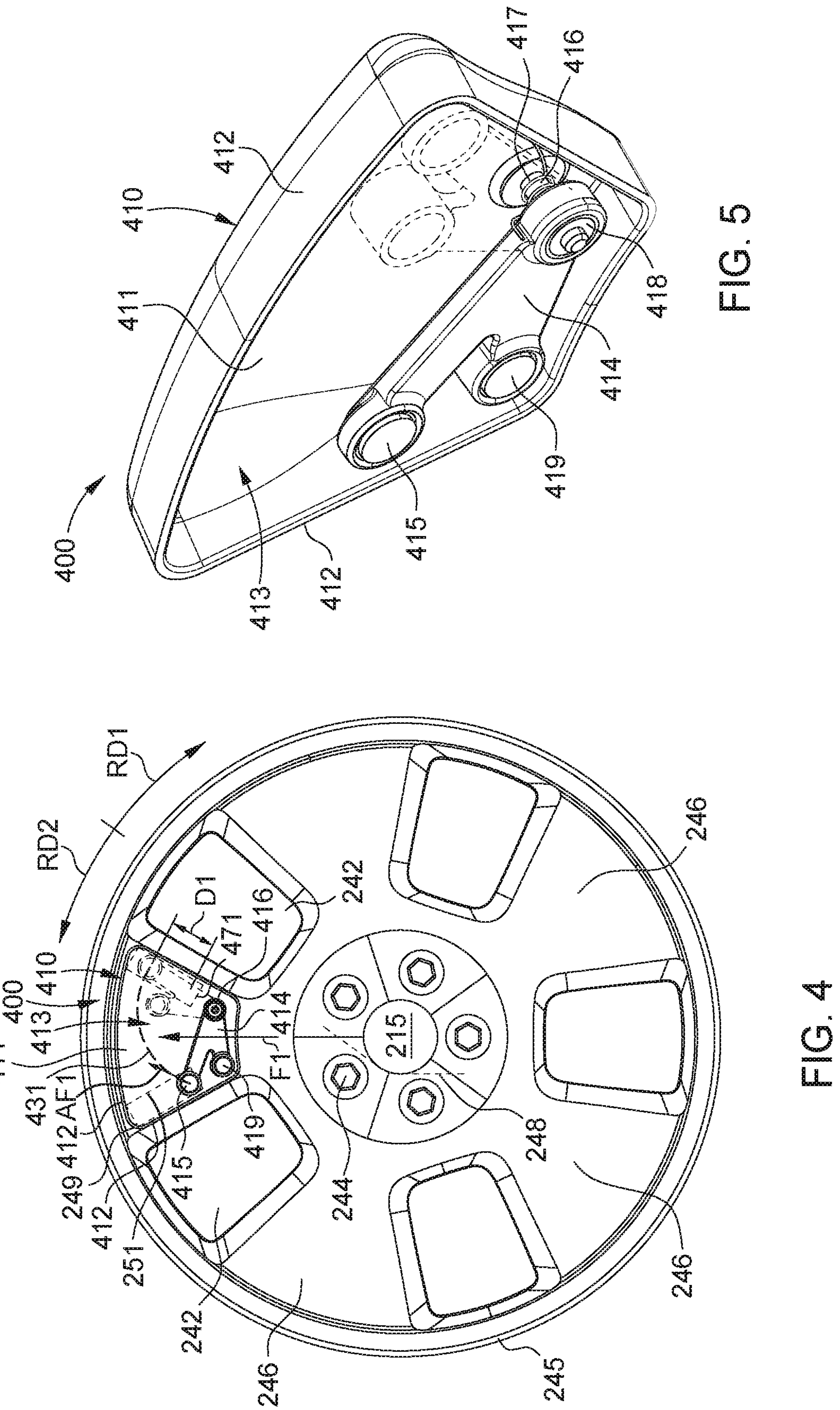
FIG. 4 is a schematic front view of the wheel module shown in FIGS. 2 and 3, according to one or more embodiments.
FIG. 5 is a schematic perspective view of the actuation system shown in FIG. 4, according to one or more embodiments.

FIG. 4 is a schematic front view of the wheel module 200 shown in FIGS. 2 and 3, according to one or more embodiments. The cover frame 210 is not shown in FIG. 4 for purposes of visual clarity.

An actuation system 400 is configured to rotationally drive the cover frame 210 relative to the wheel component 240 in response to centrifugal force F1 to at least partially cover the second wheel openings 242 (e.g., in the second position). In one or more embodiments, the actuation system 400 is configured to rotationally drive the cover frame 210 in a first rotational direction RD1 in response to the centrifugal force F1. The centrifugal force F1 is generated by spinning of the actuation system 400 and/or the wheel component 240. The actuation system 400 can spin, for example, with the wheel component 240 by an axle driving the wheel component 240. The axle can be turned, for example, by a motor of the vehicle 100 during driving of the vehicle 100. The axle can be supported by a frame (such as a steel beam frame) of the vehicle 100, and the frame of the vehicle 100 can support the motor (such as an electric motor and/or a combustion motor).

The wheel component 240 includes a retention opening 249 formed in at least one of the plurality of spokes 246. The actuation system 400 includes an actuation housing 410 including a base 411 and a plurality of sidewalls 412 defining a housing pocket 413. The actuation housing 410 is positioned in the retention opening 249 of the wheel component 240. A pivot arm 414 is positioned in the housing pocket 413 and pivotably coupled to the base 411. One or more magnets 415 are coupled to the pivot arm 414. One or more movable masses 419 are coupled to the pivot arm 414. The pivot arm 414 is pivotable between an inward position (shown in solid in FIG. 4) and an outward position (shown in ghost in FIG. 4). In one or more embodiments, the actuation system 400 includes a cartridge disposable at least partially in the cover frame 210.

As the pivot arm 414 pivots between the inward position and the outward position, an attractive magnetic force AF1 between the one or more magnets 415 and a metallic structure 251 pulls the metallic structure 251 (and the cover frame 210) to follow the one or more magnets 415. When the one or more magnets 415 are moved to the outward position, the metallic structure 251 is pulled to position 471 shown in FIG. 4. The pulling of the metallic structure 251 and the cover frame 210 toward the outward position magnetically drives the cover frame 210 in the first rotational direction RD1 and relative to the wheel component 240 to at least partially cover the second wheel openings 242. The pulling of the metallic structure 251 and the cover frame 210 toward the inward position magnetically drives the cover frame 210 in the second rotational direction RD2 and relative to the wheel component 240 to at least partially uncover the second wheel openings 242. In one or more embodiments, the metallic structure 251 has a length that is equal to or greater than a radial distance D1 between the inward position and the outward position of the one or more magnets 415.

The present disclosure contemplates that a size (such as length, diameter, and/or width) of the metallic structure 251 and/or the one or more magnets 415 can be increased or decreased to increase or decrease a magnitude of the attractive magnetic force AF1 (or repelling magnetic force, if used). A shape of the metallic structure 251 and/or the one or more magnets 415 can be altered to increase or decrease a magnitude of the attractive magnetic force AF1 (or repelling magnetic force, if used).

In the inward position, the one or more magnets 415 are aligned with the metallic structure 251 coupled to the cover frame 210. The actuation system 400 includes a shaft 416 coupling the pivot arm 414 to the actuation housing 410. A retraction spring 417 is configured to bias the cover frame 210 to rotationally drive the cover frame 210 relative to the wheel component 240 to at least partially uncover the second wheel openings 242 (e.g., in the first position). The retraction spring 417 is configured to bias the cover frame 210 in response to the centrifugal force F1 that pivots the pivot arm 414 toward the outward position. In one or more embodiments, a spring constant of the retraction spring 417 is sufficient to overcome gravitational forces acting on the pivot arm 414, the one or more magnets 415, and/or the one or more movable masses 419. The retraction spring 417 is disposed about the shaft 416 and is configured to bias the pivot arm 414 toward the inward position. The biasing of the cover frame 210 using the retraction spring 417 rotationally drives the cover frame 210 in a second rotational direction RD2 that is opposite of the first rotational direction RD1. In one or more embodiments, the metallic structure 251 includes one or more arcuate segments or one or more linear segments. In one or more embodiments, the metallic structure 251 includes a single segment, such as a single linear segment (as shown in FIG. 4). In one or more embodiments, the metallic structure 251 includes a complete ring, such as if a repelling magnetic force is used (as described below). In one or more embodiments, a bearing 418 is disposed about the shaft 416 and is disposed within the pivot arm 414.

A retraction spring 248 is configured to bias the cover frame 210 to rotationally drive the cover frame 210 relative to the wheel component 240 to at least partially uncover the second wheel openings 242 (e.g., in the first position). The retraction spring 248 is positioned between the cover frame 210 and the wheel component 240. In one or more embodiments, the retraction spring 248 is positioned about the center rod 215. The retraction spring 248 is configured to bias the cover frame 210 in response to rotation of the cover frame 210 in the first rotational direction RD1. The biasing of the cover frame 210 using the retraction spring 248 rotationally drives the cover frame 210 in a second rotational direction RD2 that is opposite of the first rotational direction RD1.

In one or more embodiments, both of the retraction spring 248 and the retraction spring 417 are included for the wheel module 200. In one or more embodiments, one of the retraction spring 248 or the retraction spring 417 is included for the wheel module 200, and the other of the retraction spring 248 or the retraction spring is omitted from the wheel module 200.

The covering and uncovering of the second wheel openings 242 can be controlled by a rotation speed (e.g., in rotations-per-minute (RPMs)) of the actuation system 400 and/or the wheel component 240. When the rotation speed is below a threshold speed, the centrifugal force F1 is low enough such that gravity and/or the second spring 417 biases the pivot arm 414, the one or more movable mases 419, and the one or more magnets 415 into the inward position such that the metallic structure 251 and the cover frame 210 are pulled toward the first position shown in FIG. 2 using the attractive magnetic force AF1 (oriented similar to a direction that is opposite of the direction shown in FIG. 4) that drives (e.g., in the second rotational direction RD2) the cover frame 210.

When the rotation speed is at or above the threshold speed, the pivot arm 414 undergoes sufficient centrifugal force F1 to pivot the pivot arm 414 and the one or more magnets 415 into the outward position such that the attractive magnetic force F1 (oriented similar to the direction shown in FIG. 4) drives the cover frame 210 into the second position shown in FIG. 3. The biasing (e.g., using the retraction spring 417) of the pivot arm 414 and the one or more magnets 415 into the inward position causes the attractive magnetic force AF1 (oriented similar to a direction that is opposite of the direction shown in FIG. 4) acting on the cover frame 210 to bias the cover frame 210 into the first position shown in FIG. 2. The threshold speed can be pre-set, for example, by a spring constant of the retraction spring 248; a spring constant of the retraction spring 417; masses and/or sizes of the pivot arm 414, the movable mass(es) 419, the magnet(s) 415, the bearing 418, and/or the cover frame 210; and/or a magnitude of the magnetic interaction between the magnet(s) 415 and the metallic structure 251 (which can be controlled by the materials, sizes, and/or masses of the magnet(s) 415 and/or the metallic structure 251). In one or more embodiments, the threshold speed is within a range of 600 rotations-per-minute to 1,500 rotations-per-minute. In one or more embodiments, the threshold speed is within a range of 675 rotations-per-minute to 1,000 rotations-per-minute, such as about 840 rotations-per-minute. The threshold speed can be a rotation speed of the wheel component 240. In one or more embodiments, the threshold speed is selected such that the vehicle 100 drives at a speed within a range of 45 miles-per-hour to 70 miles-per-hour, such as about 45 miles-per-hour. In one or more embodiments, the threshold speed is selected such that the vehicle 100 drives at a speed of about 50 miles-per-hour.

The metallic structure 251 can be magnetic (such as ferromagnetic) or non-magnetic. In one or more embodiments, the metallic structure 251 is formed of iron, steel, and/or aluminum. In one or more embodiments, the one or more magnets 415 are ferromagnetic to generate the attractive magnetic force AF1. In one or more embodiments, the one or more magnets 415 include iridium (Ir), such as an iridium manganese (IrMn) alloy. The present disclosure contemplates that the described material(s) of the metallic structure 251 and the one or more magnets 451 can be swapped with each other such that structure 251 is a magnet and the one or more magnets 451 are replaced with a metallic mass that can be magnetic or non-magnetic. In such an embodiment, the pivoting of the metallic mass pulls the magnetic structure 251 using the attractive magnetic force AF1.

In one or more embodiments, the cover frame 210 and/or the actuation housing 410 is formed of a non-metallic material, for example including one or more polymers (such as plastic(s) including but not limited to acrylonitrile butadiene styrene (ABS)) and/or one or more composites (such as carbon fiber and/or fiberglass).

The one or more movable masses 419 have a mass that is larger than a mass of the one or more magnets 415, and is larger than a mass of the pivot arm 414. The one or more movable masses 419 facilitate pivoting the pivot arm 414 between the inward position and the outward position. In one or more embodiments, the one or more movable masses 419 have a density larger than a density of the one or more magnets 415, and the pivot arm 414 has a density lower than the density of the one or more movable masses 419. In one or more embodiments, the density of the pivot arm 414 is lower than the density of the one or more magnets 415.

In addition to the above, other materials are contemplated for the subject matter described herein.

The present disclosure contemplates that a repelling magnetic force can be used in place of the attractive magnetic force AF1 to bias the cover frame 210.

As the pivot arm 414 moves between the inward position and the outward position, the pivot arm 414 can follow a path 431. The path 431 can be arcuate or linear. In one or more embodiments, the metallic structure 251 is aligned with an entirety of the path 431. In such an embodiment, the movement of the magnets 415 along the path 431 can increase a magnetic force acting on the metallic structure 251, which rotationally drives the cover frame 210 relative to the wheel component 240.

In one or more embodiments, the metallic structure 251 is aligned with a portion of the path 431 (as shown in FIG. 4). In the inward position, at least one of the one or more magnets 415 aligns with at least part of the metallic structure 251. The attractive magnetic force AF1 facilitates maintaining alignment and/or realignment of the metallic structure 251 with the at least one of the one or more magnets 415 as the one or more magnets 415 move between the inward position and the outward position. The attractive magnetic force AF1 can be oriented tangentially to a center of the cover frame 210. The direction of the attractive magnetic force AF1 can change between the inward position and the outward position.

The metallic structure 251 can include an end portion that aligns with the portion of the path 431, as shown in FIG. 4. If a repelling magnetic force is used in place of the attractive magnetic force AF1, the repelling magnetic force can be stronger when the one or more magnets 415 are aligned with the metallic structure 251, and the repelling magnetic force can be reduced or eliminated when the one or more magnets 415 are misaligned from the metallic structure 251.

FIG. 5 is a schematic perspective view of the actuation system 400 shown in FIG. 4, according to one or more embodiments.

Figure 6:
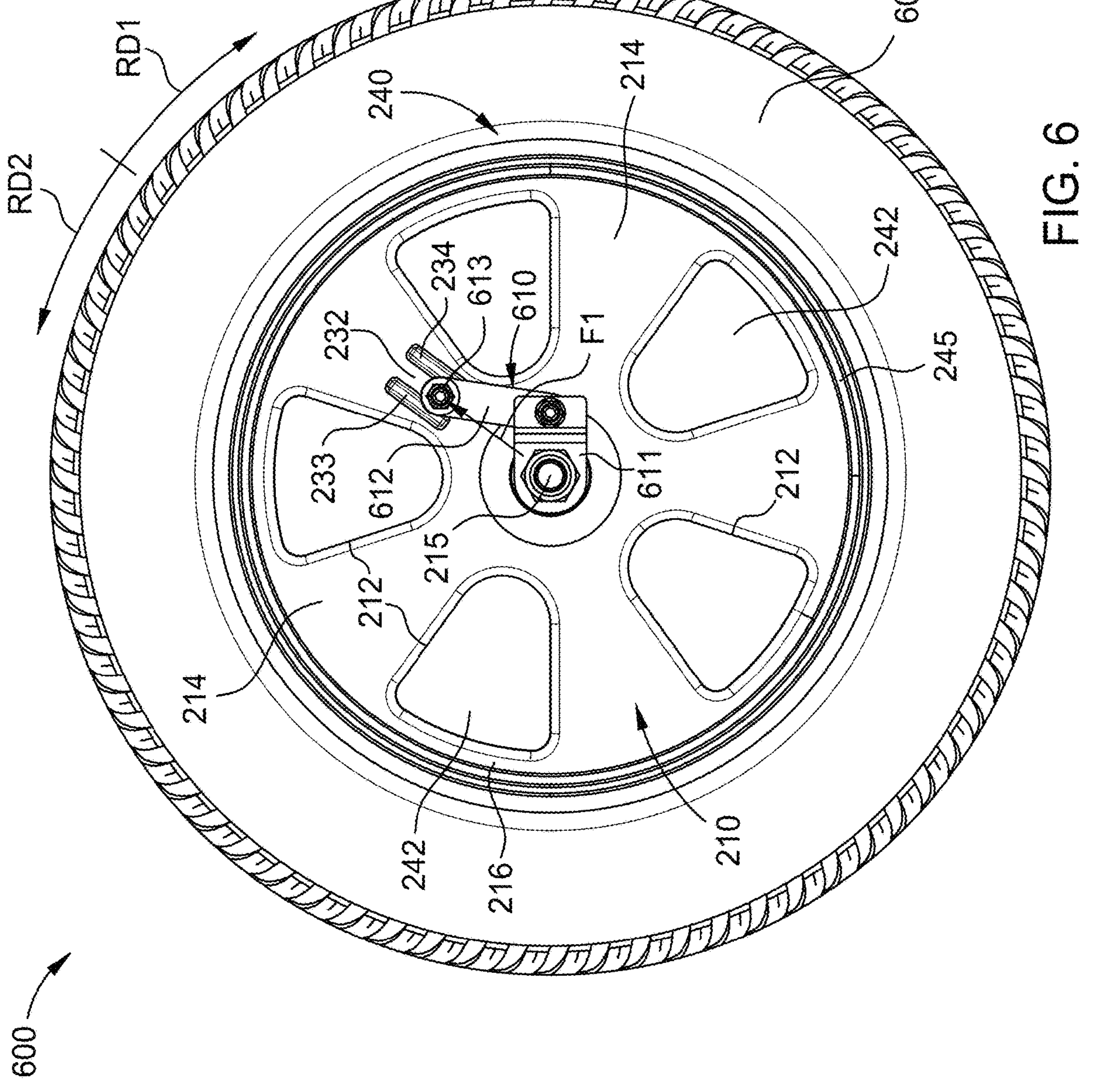
FIG. 6 is a schematic partial front view of a wheel module in a first position, according to one or more embodiments.
Figure 7:
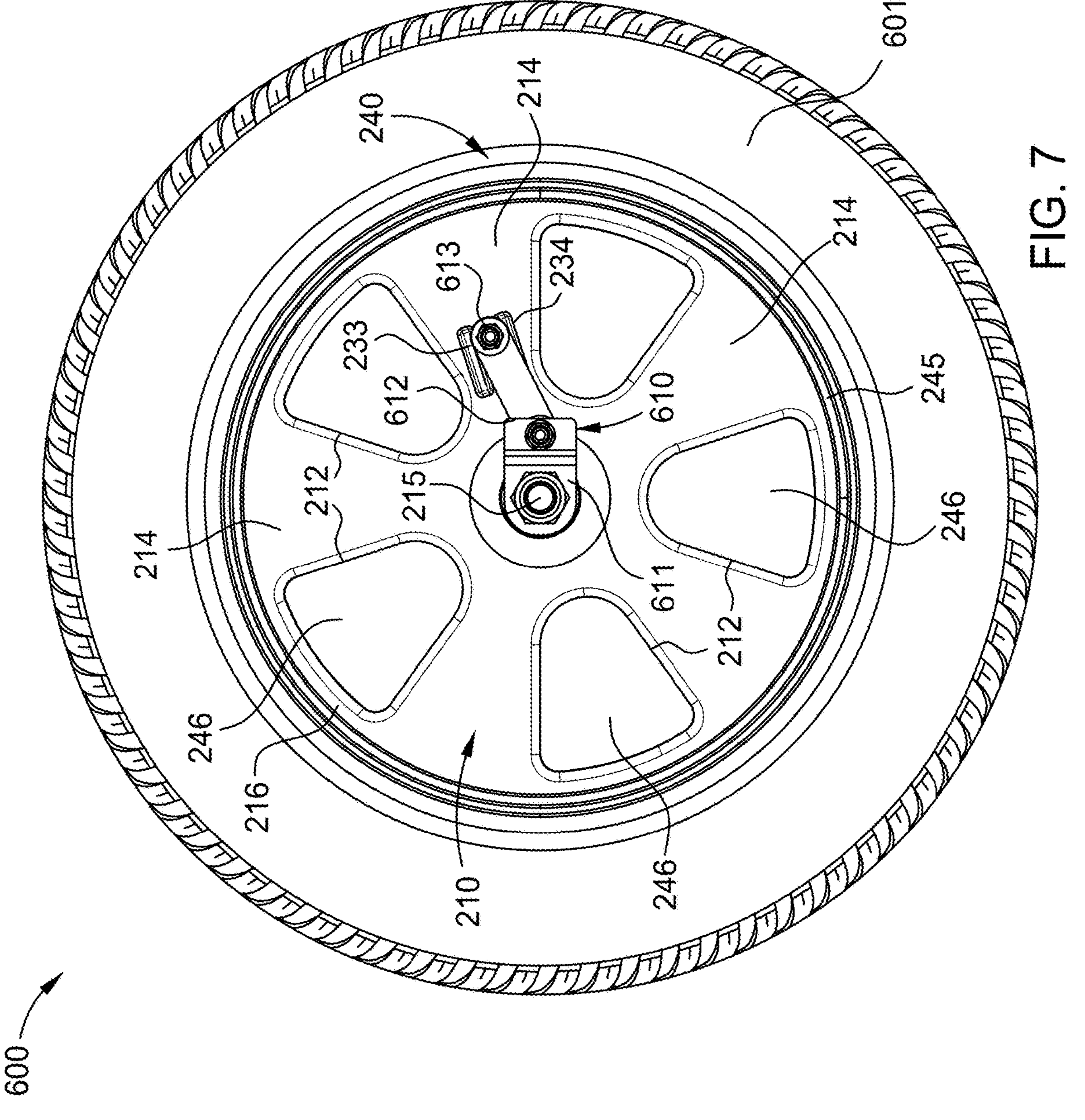
FIG. 7 is a schematic partial front view of the wheel module shown in FIG. 6 in a second position, according to one or more embodiments.

FIG. 6 is a schematic partial front view of a wheel module 600 in a first position, according to one or more embodiments. FIG. 7 is a schematic partial front view of the wheel module 600 shown in FIG. 6 in a second position, according to one or more embodiments.

The wheel module 600 may be similar to the wheel module 200 and includes one or more of the aspects, features, components, operations, and/or properties thereof. In the first position shown in FIG. 6, the second wheel openings 241 are completely uncovered by the cover frame 210. In the second position shown in FIG. 7, the divider sections 214 of the cover frame 210 at least partially cover the second wheel openings 241 (the second wheel openings 241 are shown as completely covered in FIG. 7). A tire 601 is coupled to the wheel component 240.

The cover frame 210 includes a guide channel 232. The actuation system 610 includes a retention frame 611 pivotably coupled to the center rod 215, a pivot arm 612 pivotably coupled to the retention frame 611, and a movable mass 613 coupled to the pivot arm 612. In response to the centrifugal force F1 acting on the movable mass 613, the movable mass 613 is configured to slide along the guide channel 232 to mechanically drive the cover frame 210 in a first rotational direction RD1 relative to the wheel component 240. FIG. 6 shows the movable mass 613 in an inward position along the guide channel 232, and FIG. 7 shows the movable mass 613 in an outward position along the guide channel 232.

The cover frame 210 includes a pair of rails 233, 234 extending relative to at least one of the divider sections 214. The guide channel 232 is defined at least partially between the pair of rails 233, 234. The movable mass 613 is configured to abut against one of the rails 233, 234 (such as rail 234) as the movable mass 613 slides along the guide channel 232 to mechanically drive the cover frame 210 in the first rotational direction RD1.

Figure 8:
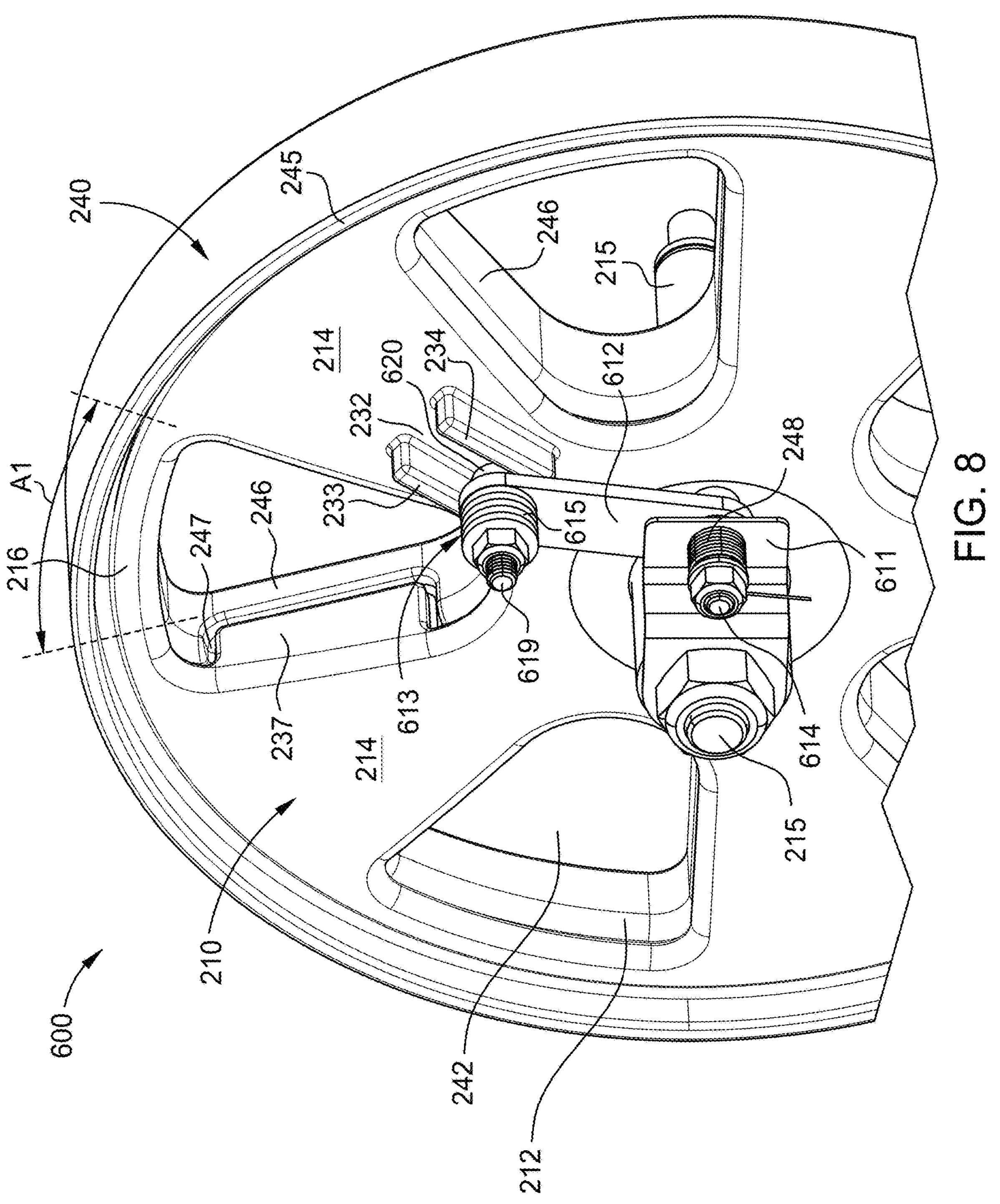
FIG. 8 is a schematic perspective front view of the wheel module shown in the first position of FIG. 6, according to one or more embodiments.

FIG. 8 is a schematic perspective front view of the wheel module 600 shown in the first position of FIG. 6, according to one or more embodiments. The actuation system 610 includes a shaft 614 coupling the pivot arm 612 to the retention frame 611. In one or more embodiments, the retraction spring 248 is disposed about the shaft 614 to bias the cover frame 210 in a second rotational direction RD2. In one or more embodiments, the movable mass 613 includes a plurality of washers 615 disposed about a second shaft 619. The present disclosure contemplates that other objects may be used in place of the washers 615. A head 620 of the second shaft 619 is disposed in the guide channel 232.

The cover frame 210 includes a locating tab 237 extending relative to at least one of the divider sections 214 and into at least one of the second wheel openings 242 of the wheel component 240. The locating tab(s) 237 can limit rotation of the cover frame 210 relative to the wheel component 240 by abutting against respective sides of two adjacent divider sections 214. A recess 247 can be formed in the side of at least one of the two adjacent divider sections 214. In one or more embodiments, the cover frame 210 is rotatable relative to the wheel component 240 by an angle A1 between an open position (where the second wheel openings 242 are completely uncovered) and a closed position (where the second wheel openings 242 are completely covered). In one or more embodiments, the angle A1 is less than 60 degrees.

In the implementation shown in FIG. 8, the angle A1 is limited by the locating tab(s) 237. In one or more embodiments, the angle A1 is limited by a spring constant of the retraction spring 248, a length of the pivot arm 612, a position of the guide channel 232, a length of the retention frame 611, and/or a mass of the movable mass 613. In one or more embodiments, the retraction spring 248 (if used) and/or the retraction spring 417 (if used) includes a torsion spring. Other springs can be used for the retraction spring 248 and/or the retraction spring 417.

As described above in relation to FIG. 4, the implementation shown in FIG. 8 for covering and uncovering of the second wheel openings 242 can be controlled based on the threshold speed. The threshold speed can be pre-set, for example, by the spring constant of the retraction spring 248; the length of the pivot arm 612; the position of the guide channel 232; the length of the retention frame 611; and/or masses and/or sizes of the movable mass 613, the pivot arm 612, and/or the cover frame 210.

Figure 9:
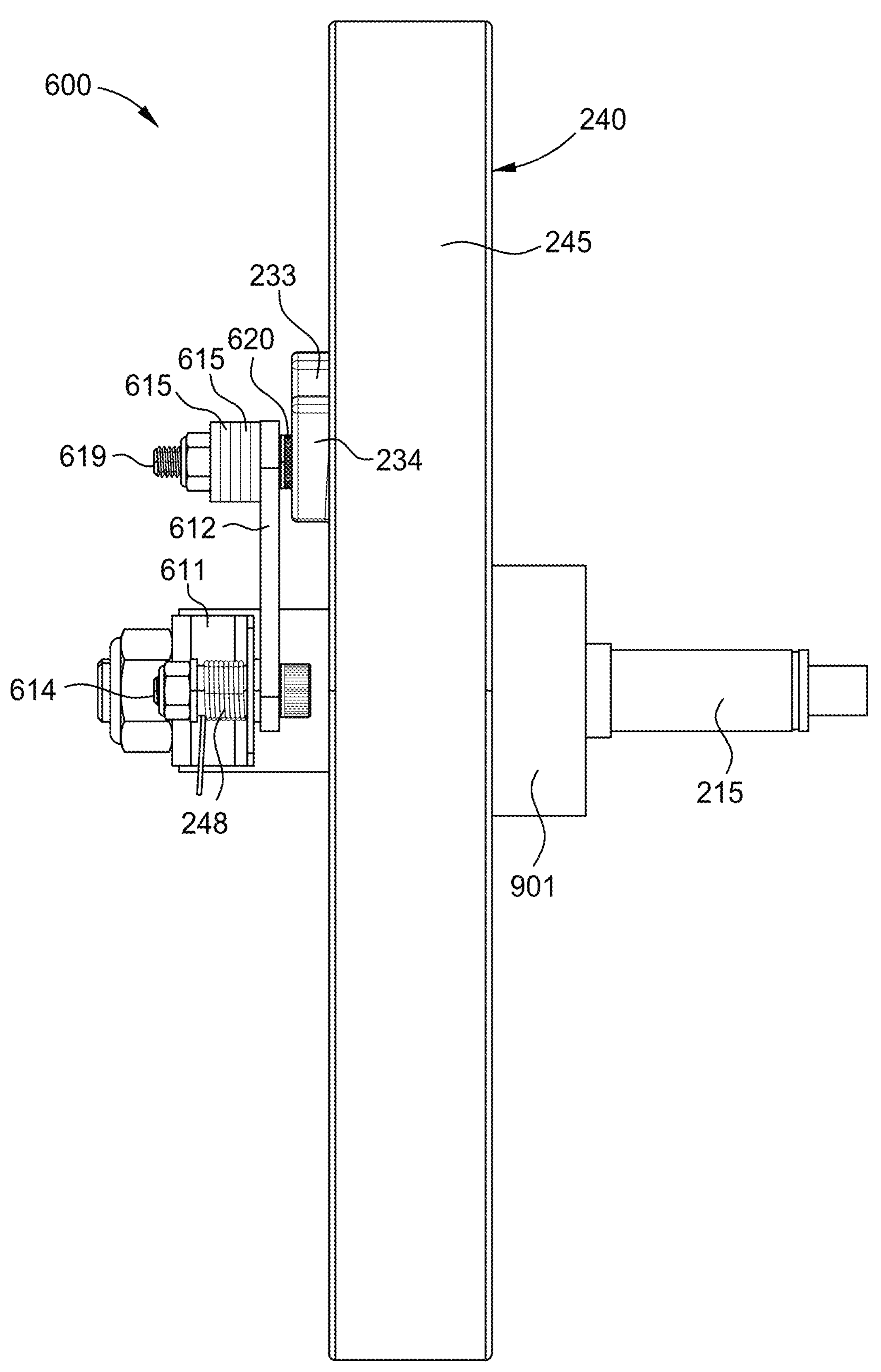
FIG. 9 is a schematic side view of the wheel module shown in FIG. 8, according to one or more embodiments.

FIG. 9 is a schematic side view of the wheel module 600 shown in FIG. 8, according to one or more embodiments. A receptacle 901 is disposed about the center rod 215, and the receptacle 901 is disposed through the cover frame 210 and through the wheel component 240.

Figure 10:
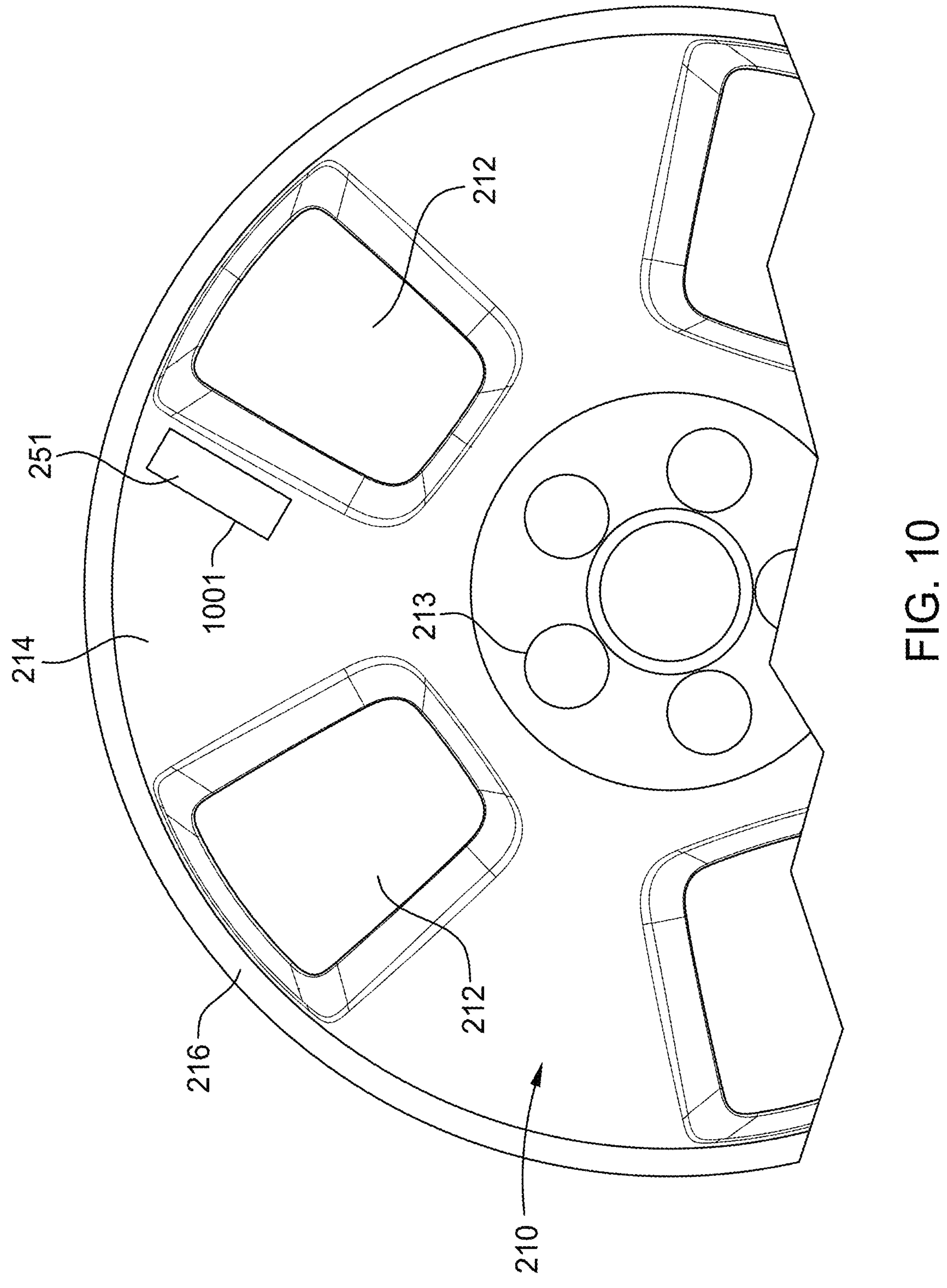
FIG. 10 is a schematic partial back view of the cover frame and the metallic structure shown in FIG. 4, according to one or more embodiments.

FIG. 10 is a schematic partial back view of the cover frame 210 and the metallic structure 251 shown in FIG. 4, according to one or more embodiments. The wheel component 240 and the actuation system 400 are not shown in FIG. 10 for purposes of visual clarity.

The metallic structure 251 (which is shown as a single linear segment, for example a single linear strip) is coupled to the cover frame 210. In one or more embodiments, the metallic structure 251 is molded into, fastened to, and/or press-fit into an opening 1001 formed in one of the divider sections 214.

Benefits of the present disclosure include cooling of vehicle components (such as brake components, e.g. brake pads); reduced fluid pressure (e.g., air pressure) acting on vehicle components; reduced wind noise; and increased aerodynamic efficiencies (e.g., due to air flow in relation to wheel modules). Benefits of the present disclosure also include reduced wear and/or increased operational lifespans of vehicle components; enhanced aesthetic appeal for wheel designs; and modularity of use across a variety of wheel designs (e.g., modularity across rim designs). As an example, wheel modules can be configured to at least partially cover wheel openings of the wheel component at higher speeds to facilitate increased aerodynamic efficiencies, and can be configured to at least partially uncover the wheel openings at lower speeds to facilitate brake cooling and reduced wheel pressure at low speeds. Such wheel modules can maintain design modularity and aesthetic appeal.

It is contemplated that one or more aspects disclosed herein may be combined. As an example, one or more aspects, features, components, operations and/or properties of the embodiments of the vehicle 100, the wheel module 200, the actuation system 400, the wheel module 600, and/or the actuation system 610 may be combined. Moreover, it is contemplated that one or more aspects disclosed herein may include some or all of the aforementioned benefits.

As an example, one or more aspects, features, components, operations and/or properties of the wheel module 600 can be used in the wheel module 200. For example, the pivot arm 414, the one or more magnets 415, the one or more movable masses 419, and/or the metallic structure 251 can be omitted; and at least part of the actuation system 610 can be disposed in the housing pocket 413. In such an implementation, the retention frame 611 can be pivotably coupled to the shaft 416, and the pair of rails 233, 234 can extend relative to the base 411. In such an implementation, the retention frame 611, the shaft 614, the pivot arm 612, the movable mass 613, and the pair of rails 233, 234 can be disposed in the housing pocket 413.

While the foregoing is directed to embodiments of the present disclosure, other and further embodiments of the disclosure may be devised without departing from the basic scope thereof, and the scope thereof is determined by the claims that follow.

What is claimed is:

1. A wheel module, comprising:

a wheel component comprising a plurality of wheel openings:

a cover frame comprising:

a plurality of openings, a plurality of divider sections at least partially dividing the plurality of openings, and a locating tab extending relative to at least one of the divider sections and into at least one of the wheel openings of the wheel component;

an actuation system configured to rotationally drive the cover frame relative to the wheel component in response to centrifugal force to at least partially cover the wheel opening; and a retraction spring configured to bias the cover frame to rotationally drive the cover frame relative to the wheel component to at least partially uncover the wheel openings.

2. The wheel module of claim 1, wherein the actuation system is configured to rotationally drive the cover frame in a first rotational direction, and the retraction spring is configured to bias the cover frame in response to rotation of the cover frame in the first rotational direction to rotationally drive the cover frame in a second rotational direction that is opposite of the first rotational direction.

3. The wheel module of claim 1, wherein the centrifugal force is generated by spinning of the wheel component and the actuation system.

4. The wheel module of claim 1, wherein:

the wheel component further comprises:

a central wheel opening, an outer wheel section, the plurality of wheel openings aligned radially between the central wheel opening and the outer wheel section, and a plurality of spokes at least partially dividing the wheel openings; and the cover frame further comprises:

a central opening, an outer section, the plurality of openings aligned radially between the central opening and the outer section, and the divider sections aligned radially between the central opening and the outer section.

5. The wheel module of claim 1, wherein the cover frame further comprises a pair of rails extending relative to at least one of the divider sections, and a guide channel defined at least partially between the pair of rails, and the actuation system comprises:

a retention frame;

a pivot arm pivotably coupled to the retention frame; and a shaft coupling the pivot arm to the retention frame, the retraction spring disposed about the shaft;

a movable mass coupled to the pivot arm and configured to slide along the guide channel, wherein the movable mass is configured to abut against one of the rails as the movable mass slides along the guide channel to mechanically drive the cover frame in a first rotational direction.

6. A vehicle comprising:

one or more wheel modules comprising:

a wheel component comprising a first wheel opening and a plurality of second wheel openings, and a cover frame comprising:

a first opening, a plurality of second openings, and a plurality of divider sections at least partially dividing the plurality of second openings; and an actuation system configured to rotationally drive the cover frame relative to the wheel component in response to centrifugal force to at least partially cover the plurality of second wheel openings; and a retraction spring configured to bias the cover frame to rotationally drive the cover frame relative to the wheel component to at least partially uncover the plurality of second wheel openings, wherein the retraction spring is disposed about a center rod and is positioned between the cover frame and the wheel component, wherein the center rod is received in the first opening.

7. The vehicle of claim 6, wherein the actuation system further comprises:

a magnet coupled to a pivot arm; and a movable mass coupled to the pivot arm, wherein the movable mass has a first mass that is larger than a second mass of the magnet.

8. The vehicle of claim 7, wherein the magnet is aligned with a metallic structure coupled to the cover frame to magnetically drive the cover frame relative to the wheel component.

9. The vehicle of claim 6, wherein the retraction spring is positioned between the cover frame and the wheel component.

10. The vehicle of claim 6, wherein the actuation system further comprises:

a pivot arm that is pivotable between an inward position and an outward position; and a shaft coupled to the pivot arm, and the retraction spring is disposed about the shaft and configured to bias the cover frame by biasing the pivot arm toward the inward position.

11. The vehicle of claim 6, wherein the actuation system is configured to rotationally drive the cover frame in a first rotational direction, the retraction spring is configured to bias the cover frame in response to rotation of the cover frame in the first rotational direction to rotationally drive the cover frame in a second rotational direction that is opposite of the first rotational direction, and the centrifugal force is generated by spinning of the wheel component and the actuation system.

12. The vehicle of claim 6, wherein:

the wheel component further comprises:

a central wheel opening, an outer wheel section, the plurality of wheel openings aligned radially between the central wheel opening and the outer wheel section, and a plurality of spokes at least partially dividing the wheel openings; and the cover frame further comprises:

a central opening, an outer section, the plurality of openings aligned radially between the central opening and the outer section, and the divider sections aligned radially between the central opening and the outer section.

13. A wheel module, comprising:

a wheel component comprising a plurality of spokes, a plurality of wheel openings, and a retention opening formed in at least one of the plurality of spokes;

a cover frame comprising:

a plurality of openings, and a plurality of divider sections at least partially dividing the plurality of openings, and an actuation system configured to rotationally drive the cover frame relative to the wheel component in response to centrifugal force to at least partially cover the wheel opening, the actuation system comprising:

an actuation housing comprising a base and a plurality of sidewalls defining a housing pocket, wherein the actuation housing is positioned in the retention opening of the wheel component, and a pivot arm positioned in the housing pocket and pivotably coupled to the base, wherein the pivot arm is pivotable between an inward position and an outward position; and a retraction spring configured to bias the cover frame to rotationally drive the cover frame relative to the wheel component to at least partially uncover the wheel openings.

14. The wheel module of claim 13, wherein the actuation system further comprises:

a magnet coupled to the pivot arm; and a movable mass coupled to the pivot arm, wherein the movable mass has a first mass that is larger than a second mass of the magnet.

15. The wheel module of claim 14, wherein the magnet is aligned with a metallic structure coupled to the cover frame to magnetically drive the cover frame relative to the wheel component.

16. The wheel module of claim 13, wherein the retraction spring is positioned between the cover frame and the wheel component.

17. The wheel module of claim 13, wherein the actuation system further comprises:

a shaft coupling the pivot arm to the actuation housing, and the retraction spring is disposed about the shaft and configured to bias the cover frame by biasing the pivot arm toward the inward position.

18. The wheel module of claim 13, wherein the actuation system is configured to rotationally drive the cover frame in a first rotational direction, and the retraction spring is configured to bias the cover frame in response to rotation of the cover frame in the first rotational direction to rotationally drive the cover frame in a second rotational direction that is opposite of the first rotational direction.

19. The wheel module of claim 13, wherein the centrifugal force is generated by spinning of the wheel component and the actuation system.

20. The wheel module of claim 13, wherein:

the wheel component further comprises:

a central wheel opening, an outer wheel section, the plurality of wheel openings aligned radially between the central wheel opening and the outer wheel section, and a plurality of spokes at least partially dividing the wheel openings; and the cover frame further comprises:

a central opening, an outer section, the plurality of openings aligned radially between the central opening and the outer section, and the divider sections aligned radially between the central opening and the outer section.

* * * * *